United States Patent
Almy et al.

(10) Patent No.: US 10,469,024 B2
(45) Date of Patent: Nov. 5, 2019

(54) PRE-ASSEMBLED NESTING PHOTOVOLTAIC MODULE BRACKET FOR SOLAR TRACKER

(71) Applicant: SolarCity Corporation, San Mateo, CA (US)

(72) Inventors: Charles Bernardo Almy, Berkeley, CA (US); Kathryn Austin Pesce, San Francisco, CA (US)

(73) Assignee: SolarCity Corporation, San Mateo, CA (US)

( * ) Notice: Subject to any disclaimer, the term of this patent is extended or adjusted under 35 U.S.C. 154(b) by 225 days.

(21) Appl. No.: 15/094,887

(22) Filed: Apr. 8, 2016

(65) Prior Publication Data

US 2017/0294870 A1    Oct. 12, 2017

(51) Int. Cl.
| | | |
|---|---|---|
| *H02S 20/32* | (2014.01) | |
| *F24S 30/425* | (2018.01) | |
| *F24S 25/63* | (2018.01) | |
| *F24S 25/00* | (2018.01) | |

(52) U.S. Cl.
CPC .............. *H02S 20/32* (2014.12); *F24S 25/63* (2018.05); *F24S 30/425* (2018.05); *F24S 2025/013* (2018.05); *Y02E 10/47* (2013.01)

(58) Field of Classification Search
CPC ......... H02S 20/32; F24S 25/63; F24S 30/425; F24S 2025/013
See application file for complete search history.

(56) References Cited

U.S. PATENT DOCUMENTS

| | | | |
|---|---|---|---|
| 4,498,822 | A  | 2/1985  | Diba |
| 6,809,251 | B2 | 10/2004 | Dinwoodie |
| 7,647,924 | B2 | 1/2010  | Hayden |
| 7,832,157 | B2 | 11/2010 | Cinnamon |
| 8,109,393 | B2 | 2/2012  | Haeberlein |
| 8,371,076 | B2 | 2/2013  | Jones et al. |
| 8,567,134 | B1 | 10/2013 | Grushkowitz et al. |
| 8,650,813 | B2 | 2/2014  | Botkin et al. |

(Continued)

FOREIGN PATENT DOCUMENTS

| | | |
|---|---|---|
| CN | 201000241 Y | 1/2008 |
| DE | 19601069 A1 | 4/1997 |

(Continued)

OTHER PUBLICATIONS

First Action Interview Pilot Program Pre-Interview Communication dated May 23, 2018 in U.S. Appl. No. 15/092,602, filed Apr. 6, 2016. 4 pages.

(Continued)

*Primary Examiner* — Golam Mowla
(74) *Attorney, Agent, or Firm* — Kilpatrick Townsend & Stockton LLP

(57) ABSTRACT

Photovoltaic module assemblies are mounted onto a solar tracker array torque tube via photovoltaic module brackets. The photovoltaic module brackets provide for stacking photovoltaic module assemblies in a nested configuration. The photovoltaic module assemblies are pre-assembled off-site, at a location different than the photovoltaic array installation site, and the nested configuration allows for efficient transportation of pre-assembled photovoltaic module assemblies to the installation site.

13 Claims, 14 Drawing Sheets

(56) References Cited

U.S. PATENT DOCUMENTS

| | | |
|---|---|---|
| 8,757,567 B2 | 6/2014 | Ciasulli et al. |
| 8,813,460 B2 | 8/2014 | Cinnamon et al. |
| 8,822,812 B2 | 9/2014 | Wares |
| 8,839,784 B2 | 9/2014 | Wares et al. |
| 8,881,415 B2 | 11/2014 | Barton |
| 8,887,920 B2 | 11/2014 | Pelman et al. |
| 9,172,325 B2 | 10/2015 | Klinga et al. |
| 9,184,324 B2 | 11/2015 | Wares et al. |
| 9,263,985 B2 | 2/2016 | Silberschatz et al. |
| 9,281,778 B2 | 3/2016 | Corio et al. |
| 2004/0140002 A1 | 7/2004 | Brown et al. |
| 2006/0005875 A1 | 1/2006 | Haberlein |
| 2006/0032527 A1* | 2/2006 | Stevens ............... H01L 31/048 136/251 |
| 2010/0089390 A1 | 4/2010 | Miros et al. |
| 2010/0313499 A1 | 12/2010 | Gangemi |
| 2011/0290307 A1 | 12/2011 | Workman et al. |
| 2012/0180845 A1 | 7/2012 | Cole et al. |
| 2012/0233940 A1 | 9/2012 | Perkins et al. |
| 2014/0246549 A1 | 9/2014 | West et al. |
| 2014/0261626 A1 | 9/2014 | Ripoll Agullo |
| 2014/0270930 A1 | 9/2014 | Grushkowitz |
| 2014/0318605 A1 | 10/2014 | Huzyak et al. |
| 2014/0360552 A1 | 12/2014 | Britcher et al. |
| 2015/0101996 A1 | 4/2015 | Nayar |
| 2015/0104239 A1 | 4/2015 | Schaefer et al. |

FOREIGN PATENT DOCUMENTS

| | | |
|---|---|---|
| DE | 29908190 U1 | 8/1999 |
| DE | 10336145 A1 | 3/2005 |
| DE | 102004049595 B3 | 3/2006 |
| DE | 102010005194 A1 | 9/2010 |
| DE | 102012202256 A1 | 5/2013 |
| DE | 202013005668 U1 | 10/2014 |
| EP | 2549198 B1 | 12/2013 |
| JP | 2006278738 A | 10/2006 |
| WO | 2015024542 A1 | 2/2015 |

OTHER PUBLICATIONS

First Action Interview Pilot Program Pre-Interview Communication dated Jun. 7, 2018 in U.S. Appl. No. 15/092,610, filed Apr. 6, 2016. 4 pages.

* cited by examiner

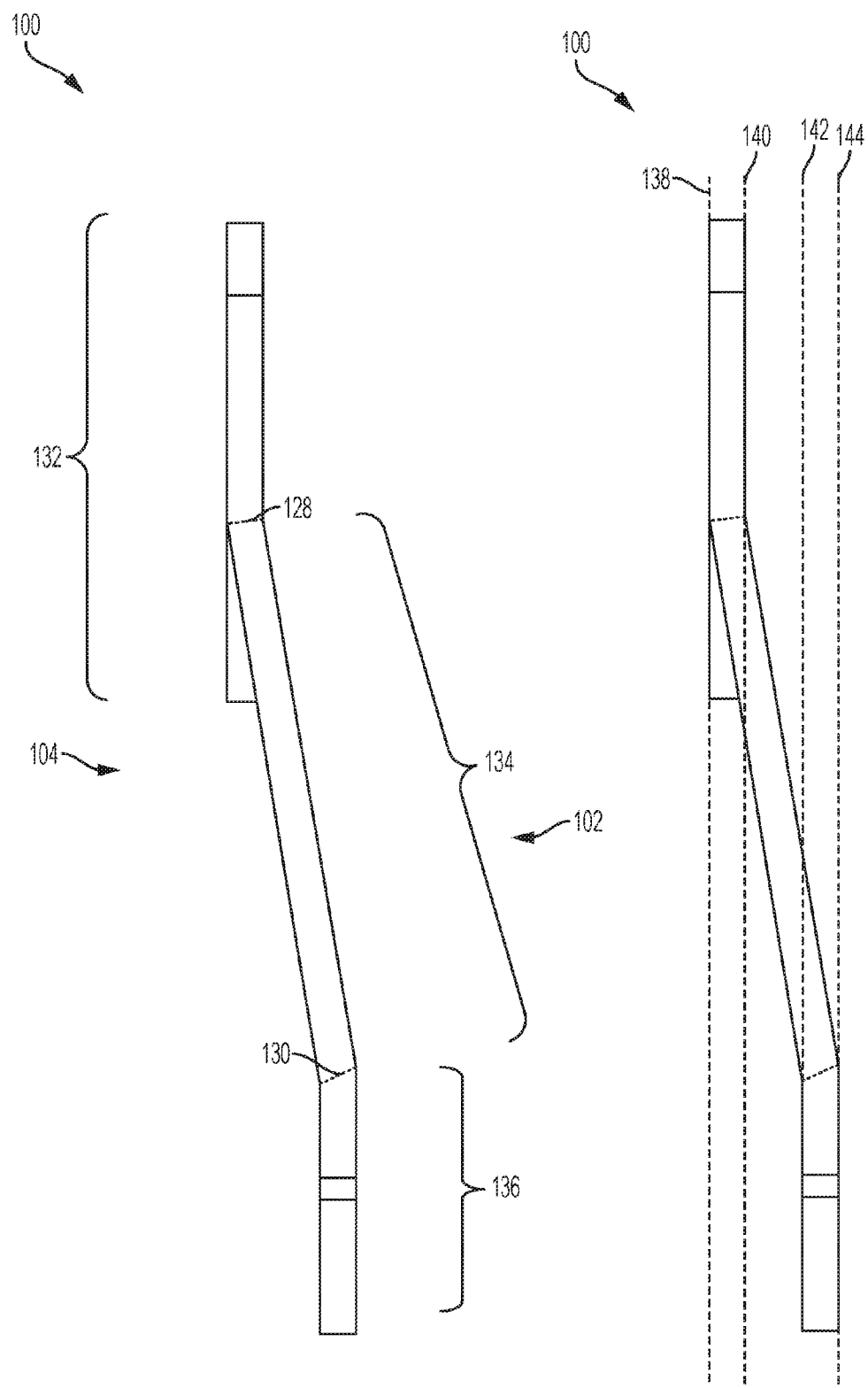

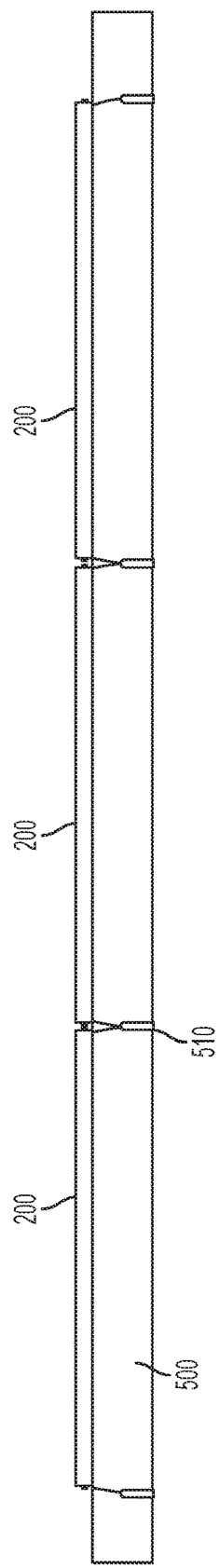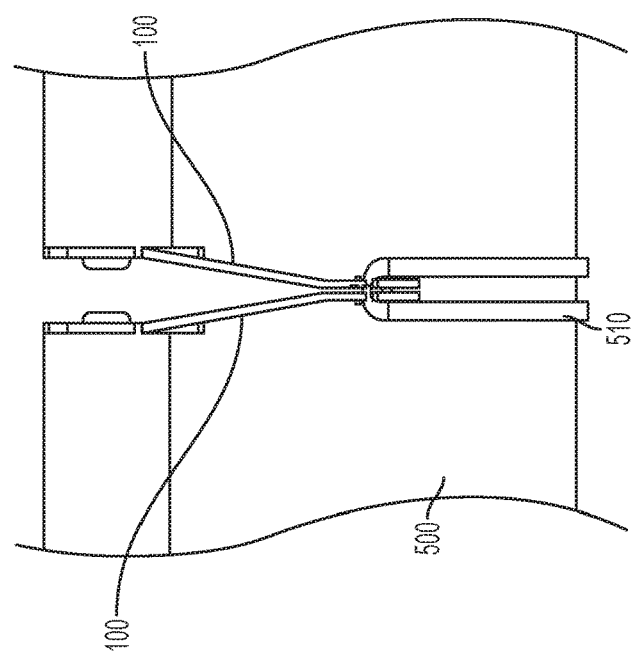

PRE-ASSEMBLED NESTING PHOTOVOLTAIC MODULE BRACKET FOR SOLAR TRACKER

TECHNICAL FIELD

The present invention relates to photovoltaic modules and photovoltaic tracker arrays assembled therefrom.

BACKGROUND OF THE INVENTION

Solar trackers are used to rotate photovoltaic (PV) modules to keep them perpendicular to the direct rays of the sun. Keeping the PV modules, as part of an array, at this orientation increases or optimizes the amount of energy that can be generated by the array, because energy generated by the array drops off with the cosine of the angle of incidence of solar rays on the surface of the array. Although trackers add an additional cost per watt over fixed ground-mount systems, the cost is typically recouped on arrays of one megawatt or larger.

In a single-axis tracker, photovoltaic modules are suspended above the ground in one or more horizontal rows, connected to a beam referred to as a torque tube. The torque tube is generally oriented along a North-South axis, and is attached to a drive mechanism actuated by a controller to rotate the photovoltaic modules attached to the torque tube over the course of the day to maintain a substantially constant angle with the sun as the sun progresses through the sky.

More sophisticated trackers may include dual-axis trackers that not only rotate modules from East-to-West but also tilt modules in a North-South direction toward the equator. With dual-axis trackers, modules are usually clustered together in individual sections, spaced apart from one another since they need greater spacing due to intra-row shading (shading of one section by an adjacent section in the same row), in addition to the inter-row shading also present in single-axis trackers.

Because tracker arrays require very little post installation maintenance, the viability of tracker array projects often turns on the projected rate of return derived from comparing the fixed value of the energy generated over the lifetime of the system versus the upfront costs of the hardware and of the installation. In a multi-megawatt project, cost reductions of pennies per watt can be the difference between a project being viable or too expensive. Therefore, tracker designers are always seeking innovations to lower installation and hardware costs.

Accordingly, there remains a need for photovoltaic module assembly hardware that can make installation of solar tracker arrays more efficient and cost effective.

BRIEF SUMMARY OF THE INVENTION

In various aspects, the present disclosure provides for: photovoltaic (PV) module brackets (also referred to as a mounting bracket); a section of a PV array having PV modules assemblies mounted onto a torque tube, with each PV module assembly including a pair of PV module brackets on opposing sides of the PV module, through which the PV module assemblies are mounted onto the torque tube and also through which a plurality of the PV module assemblies are stacked with the PV module brackets in a nested configuration; and a method of assembling a section of a PV tracker array.

In some embodiments, the PV module connectors are provided as paired sets, with left-handed and right-handed versions of the PV module brackets configured to connect to a PV module on opposing sides of the PV module. A plurality of PV module assemblies, each comprising a PV module and a paired set of PV module brackets, may be stacked in a nested configuration.

Various embodiments of the invention provide new and improved methods and systems for attaching solar panels to a torque tube of a solar tracker, and for storing and transporting solar panels to be attached to a torque tube. Various embodiments will reduce costs and increase installation speed over conventional methods and systems. These and other embodiments are shown and discussed in greater detail in the figures and corresponding detailed description.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

FIG. 1B shows an end view of PV module connector of FIG. 1A.

FIG. 1C shows an end view of PV module connector of FIG. 1A, including indications of parallel planes of surfaces of PV module connector.

FIG. 5D shows a side view of a section of a PV array with three PV module assemblies attached to a torque tube with toggle clamps, according to aspects of the disclosure.

FIG. 5E shows a detailed side view of a section of a PV array with PV module assemblies attached to a torque tube with toggle clamps, according to aspects of the disclosure.

DETAILED DESCRIPTION OF THE INVENTION

Figure 1A:
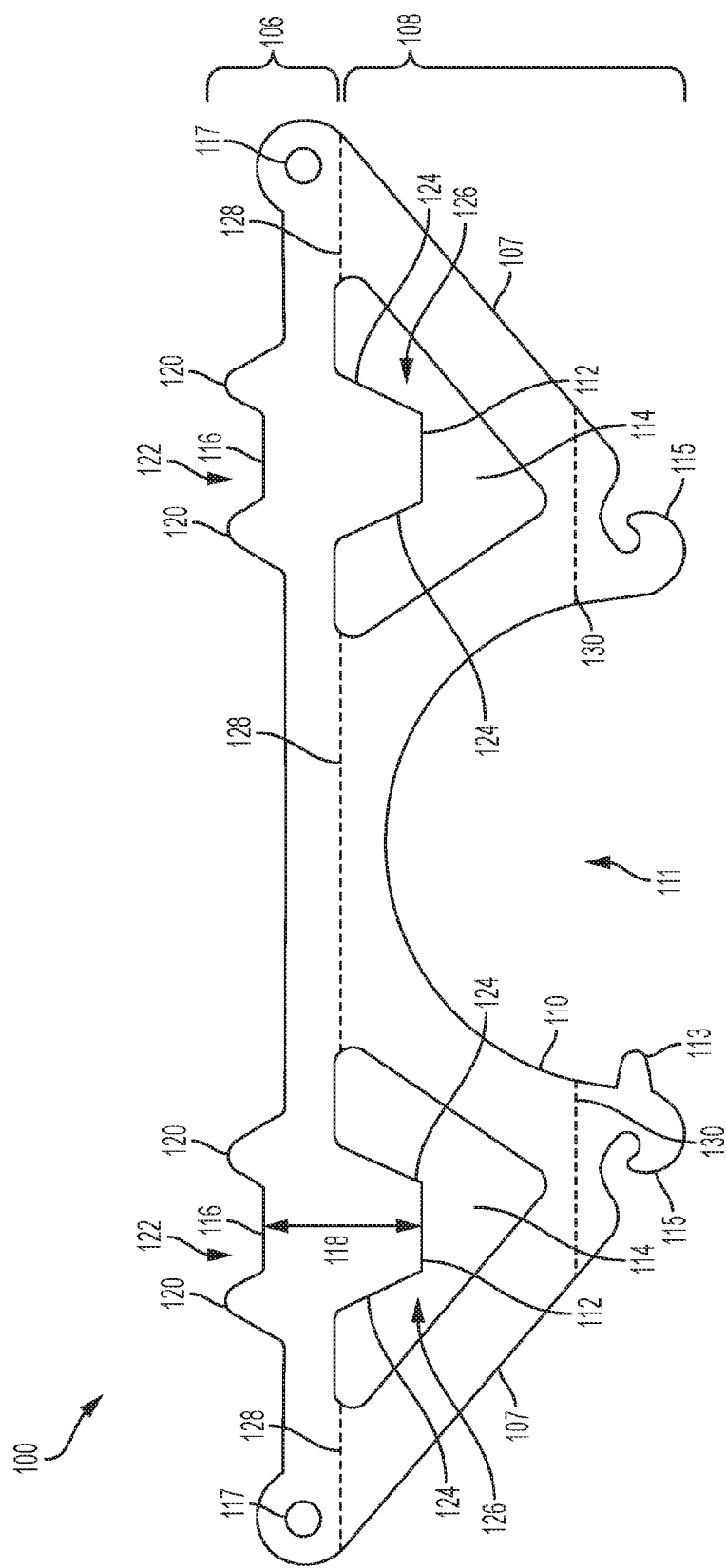
FIG. 1A shows a PV module connector, according to aspects of the disclosure.

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

Solar arrays that track the daily movement of the sun typically include one or more rows of photovoltaic modules, sometimes referred to as solar panels, that are attached to contiguous sections of pipe, referred to collectively or individually as torque tubes. A drive motor rotates the torque tube in accordance with a predetermined algorithm to keep the attached PV modules "on sun", in other words substantially perpendicular to direct solar radiation. These types of solar trackers are referred to as single axis trackers arrays. Single axis tracker arrays may include a drive motor on each torque tube, or alternatively a common drive assembly that interconnects multiple torque tubes to rotate them simultaneously. Spacing between rows of torque tubes is sometimes necessary to allow the PV modules to freely rotate without interference from PV modules in adjacent rows and also to prevent inter-row shading.

Mounting photovoltaic modules to torque tubes must be done in a secure way that is both strong and will last for many years with little to no maintenance and without excessive cost or weight. Conventional methods of achieving this strength and durability can be time consuming and require specialized or heavy equipment. The present disclosure includes pre-assembled PV module assemblies than can be attached to a torque tube using brackets that are pre-assembled to the PV module prior to installation, thus saving time by eliminating the need to attach brackets to PV modules at the installation site of a PV array. Because the PV modules assemblies are pre-assembled, valuable time at the installation site is not used attaching brackets to PV modules or attaching brackets to torque tubes and then attaching PV modules to the mounted brackets. This time savings significantly reduces the amount of time spent by installation crews at installation sites.

Prior to this invention, pre-assembling brackets to PV module off-site, i.e. at a location other than the installation site, was avoided because the attached brackets would cause problems associated with storage and transportation. For example, the PV module assemblies may stack inefficiently because a large space between the surfaces of adjacent PV modules is created because the portion of brackets to receive a torque tube of a first PV module assembly would stack on top of a surface second PV module assembly. The space been PV modules would lead to additional space requirements for each PV module during storage and transit. This additional space leads to the need for larger and/or more trucks to be sent to an installation site, which adds costs to the installation.

Further, the stacking PV modules with brackets attached may require additional packing material to ensure that a bracket attached to a PV module does not damage adjacent PV modules. Further, additional cost is saved, because the brackets of the PV module assemblies can include features to attach to a torque tube without rivets thus eliminating blind riveting into a torque tube, which can be time consuming. The attachment of a bracket to a torque tube may be done for example using a clamp to hold the bracket onto the torque tube; the brackets can attach to the torque tube through the use of tab or projection structure extending from the brackets into holes formed in the wall of the torque tube. Additionally, the photovoltaic modules brackets may be configured to exert a restoring spring-like force when fit and stretched over the exterior surface of a torque tube for added stability and strength.

The PV module brackets attached to the sides of a PV module may be identical, mirror images, or substantial mirror images including a combination of identical features, mirror image features and/or unique features. As used herein, the terms "right-hand" and "left-hand" refer to PV module brackets that are mirror images or substantial mirror images of each other. For example, as will be discussed below, it is beneficial for the attachment tabs of two PV module brackets attached to a PV module to be facing the same direction, therefore an attachment tab of a right hand bracket is on the opposite side as the attachment tab of a left hand bracket so that when attached to a PV module the two attachment tabs face the same direction.

The right and left handed PV module brackets are not necessarily identical or interchangeable, but can have many mirrored elements. This naming convention is for ease of reference, as it can be understood that the order in which PV modules are assembled or mounted, or the decision to identify one end of a PV module as the upper, lower, left, right, or end versus another, is contextual.

FIG. 1A shows a profile view of PV module bracket 100, and FIG. 1B shows a side view of PV module bracket 100. PV module bracket 100 can include an outer surface 102 that faces away from a PV module when PV module bracket 100 is attached to a PV module and an inner surface 104, which faces, and can contact, a PV module when PV module bracket 100 is attached to a PV module. PV module bracket 100 can further include an upper portion 106 including PV module mounting features and stacking features, and a lower portion including torque tube attachment features. Lower portion 108 can be substantially trapezoidal in shape. Upper portion 106 and lower portion 108 are naming conventions, and are used herein to refer to different portions of PV module bracket 100. During use, PV module bracket 100 can be oriented in any direction. For example, as discussed below, while stacked lower portion can be above upper portion relative to gravity and while attached to a torque tube upper portion can be above lower portion relative to gravity.

Lower portion 108 of PV module bracket 100 can include torque tube recess edge 110 forming a torque tube recess 111, also referred to as a saddle portion. Torque tube recess 111 can be configured to receive a torque tube in order to attach PV module bracket 100 to a torque tube. Torque tube recess 111 can be round corresponding to use with a round torque tube, or torque tube recess 111 can be formed into a different shape to receive and match the shape of torque tubes with various cross sections.

As shown in FIG. 1A, one end of torque tube recess edge 110 can include attachment tab 113 extending from an end of torque tube recess edge 110 toward a center of the cross section of a torque tube that torque tube recess is configured to receive. For example, for a circular torque tube, attachment tab 113 extends toward the center of the circular cross section. As shown in FIG. 1A, PV module bracket 100 can include attachment tab 113 on the left side, this is referred to as a left-hand PV module bracket 100A. Further, embodiments of PV module bracket 100 can include attachment tab 113 on the right side, this is referred to as a right-hand PV module bracket 100B. Left-hand PV module bracket 100A and right-hand PV module bracket 100B can be mirror images of each other, or can be substantial mirror images of each other, as defined above. In embodiments, attachment tab 113 can be located at any position along the torque tube recess edge 110. Further, in embodiments, especially for use with non-circular torque tubes, PV module bracket may not include attachment tabs and alignment of PV module bracket with a torque tube can be accomplished through the geometry of a torque tube being complementary to geometry of a torque tube recess. For example, a square shaped torque tube and complementary square shaped torque tube recess would not require an attachment tab for alignment.

PV module bracket 100 further can include clamp hooks 115 positioned at ends of torque tube recess edge 110. As is discussed in detail below, clamp hooks 115 can provide attachment points for mounting PV module bracket 100 to a torque tube with a clamp.

PV module bracket 100 can further include two stacking features located on either side of the torque tube recess 111. Each stacking feature can include a stacking aperture 114 positioned in lower portion 108. Stacking apertures 114 can be located on both sides of torque tube recess 111. Located within each stacking aperture 114 can be a stacking projection 126 that can be made up of a lower stacking surface 112 and two alignment sidewalls 124 on either side of from lower stacking surface 112 and extending toward upper portion 106. Opposite each lower stacking surface 112 can be an upper stacking surface 116 on upper portion 106 of PV module bracket facing away from PV module bracket 100 and parallel to lower stacking surface 112.

The distance 118 between upper stacking surface 116 and lower stacking surface 112 can correspond to the thickness of a PV module to which PV module bracket 100 is to be attached. Distance 118 can be greater than, less than, or equal to the thickness of a PV module which PV module bracket 100 is to be attached. The stacking feature further can include alignment tabs 120 on either side of upper stacking surface 116 which extend upper stacking surface. Upper stacking surface 116 and alignment tabs 120 combine to form stacking recess 122.

Stacking recess 122 and stacking projection 126 can be sized and shaped so that stacking projections 126 of a first pair of PV module brackets can be received by stacking recesses 122 of a second pair of PV module brackets, as discussed below in relation to stacking PV module assemblies. As shown, stacking projection 126 can be positioned facing toward lower portion 108, however in embodiments, stacking recess can be positioned to face toward bottom portion and stacking projection to be positioned to face outward and away from upper portion 106. Further, in embodiments with multiple stacking features, stacking features of PV module bracket can be oriented in different ways relative to each other.

PV module bracket 100 can further include rivet apertures 117 configured to receive a rivet to attach PV module bracket 100 to a PV module. Rivet apertures 117 can be positioned in upper portion 106 on opposite sides of torque tube recess edge 110, as shown in FIG. 1A. PV module bracket 100 can further include angled side supports 107 extending between clamp hook 115 and rivet apertures 117. As discussed in detail below, the angle of angled side support 107 can be determined so that rivet apertures 117 of nested PV module brackets are not overlapped by lower portions 108 of adjacent PV module brackets 100.

PV module bracket further can include a first bend 128 and a second bend 130. First bend and second bend delimitate three contiguous sections of PV module bracket. The three continuous sections can include a PV stacking section 132, an angled section 134, and a clamp section 136. Stacking section 132, angled section 134, and clamp section 136 each can include a portion of inner surface 104 and a portion of outer surface 102. First bend 128 can create an angle between stacking section 132 and angled section 134 which can position clamp section 136 to a relative position outside of an area between a plane 138 of inner surface of the stacking section 132 and a plane 140 of outer surface of stacking section 132, as shown in FIG. 1C. As is discussed in detail below, the angle of first bend 128 can allow PV module assemblies, including PV module brackets 100, to nest with similar PV module assemblies so that stacking projection 126 of a first PV module assembly can be received by a stacking recess 122 of a second PV module assembly. As shown in FIG. 1A, first bend 128 can include three sections along a line, wherein the line passes through portions of stacking projection 126 but stacking projection does not include first bend 128.

Second bend 130 can include an angle which corresponds to angle of first bend 128 so that inner surface of clamp section 136 is on a plane 142 that is parallel to planes 138 and 140 and outer surface of clamp section 136 is on a plane 144 that is also parallel to planes 138 and 140. For example, the angle of first and second bend can be between 5 and 20 degrees.

The size of the bracket can be based on the size of the PV module and the size of the torque tube. For example, heavier and longer PV modules benefit from a longer distance between rivet apertures in order to place less shear stress on the rivets. In embodiments, the length of PV module bracket 100 in a direction through rivet apertures 117 can be from about two hundred millimeters to about one thousand millimeters (200 mm-1000 mm), or a length of any increment or gradient thereof.

While the embodiment shown is generally left-right symmetrical, except for the attachment tab, embodiments of PV module brackets can include additional features that are not symmetrical. For example, the stacking features may not be symmetrical, and may have opposite orientations, or completely different geometries. Additionally, in embodiments, PV module brackets may include ornamental cutout features.

Figure 2A:
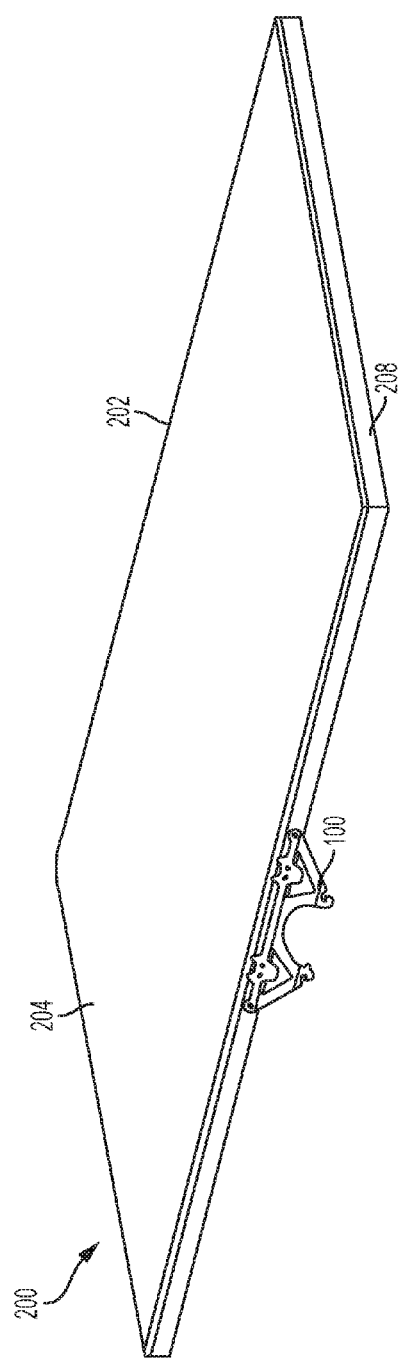
FIG. 2A shows a perspective top view of a PV module assembling, including a PV module and two PV module connectors according to aspects of the disclosure.
Figure 2B:
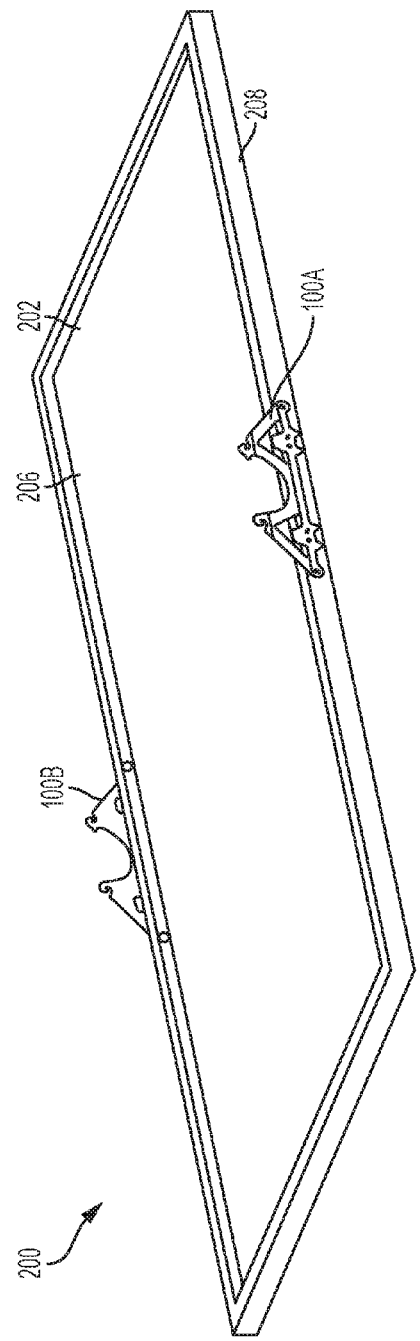
FIG. 2B shows a perspective bottom view of a PV module assembling, including a PV module and two PV module connectors.

FIGS. 2A and 2B show PV module assembly 200, from top and bottom perspective views respectively. As shown, PV module assembly 200 can include PV module 202 and two PV module brackets 100. In embodiments, PV module assembly 200 can include a left hand PV module bracket 100A and a right-hand PV module bracket 100B, as shown in FIG. 2B, so that attachment tabs 113 of PV module brackets 100 of PV module assembly 200 extend in the same direction, as opposed to toward one another in opposite directions as would be the case if identical PV module brackets were attached on opposing sides of PV module 202. Having attachment tabs 113 extending in the same direction can allow for PV module assembly to more easily be attached to a torque tube. PV module 202, of PV module assembly 200, can include a top side 204, which can include PV cells configured to face the sun to absorb UV radiation, and a bottom side 206 which when installed in a PV array faces a torque tube and can include power distribution elements. As shown, PV module 202 can be rectangular, having a long edge and a short edge, and as considered herein, photovoltaic modules can be rectangular modules as known in the industry, including but not limited to, 60-cell PV modules, 72-cell PV modules, 80-cell PV modules, 96-cell PV modules, and the like. Generally, for any given photovoltaic array section, photovoltaic modules will be the same size, operate at the same voltage, and generate the same amount of power, such that no individual photovoltaic module of photovoltaic array section becomes an operational drag on the other photovoltaic modules.

PV module 202 can include a frame 208 around the periphery of PV module 202. Frame 208 can be used to attach mounting hardware to PV module 202. As shown in FIGS. 2A and 2B, PV module bracket 100A can be attached to a first side of frame 208 and PV module bracket 100B can be attached to a second side of frame 208, opposite PV mounting bracket 100A, so that torque tube recesses 111 of PV module bracket 100A and PV module bracket 100B align. PV mounting brackets 100A and 100B extend in a direction perpendicular to bottom surface 206 and in the direction bottom surface 206 faces. This configuration allows PV module assembly 200 to attach to a torque tube with bottom side 206 facing the torque tube.

Figure 2C:
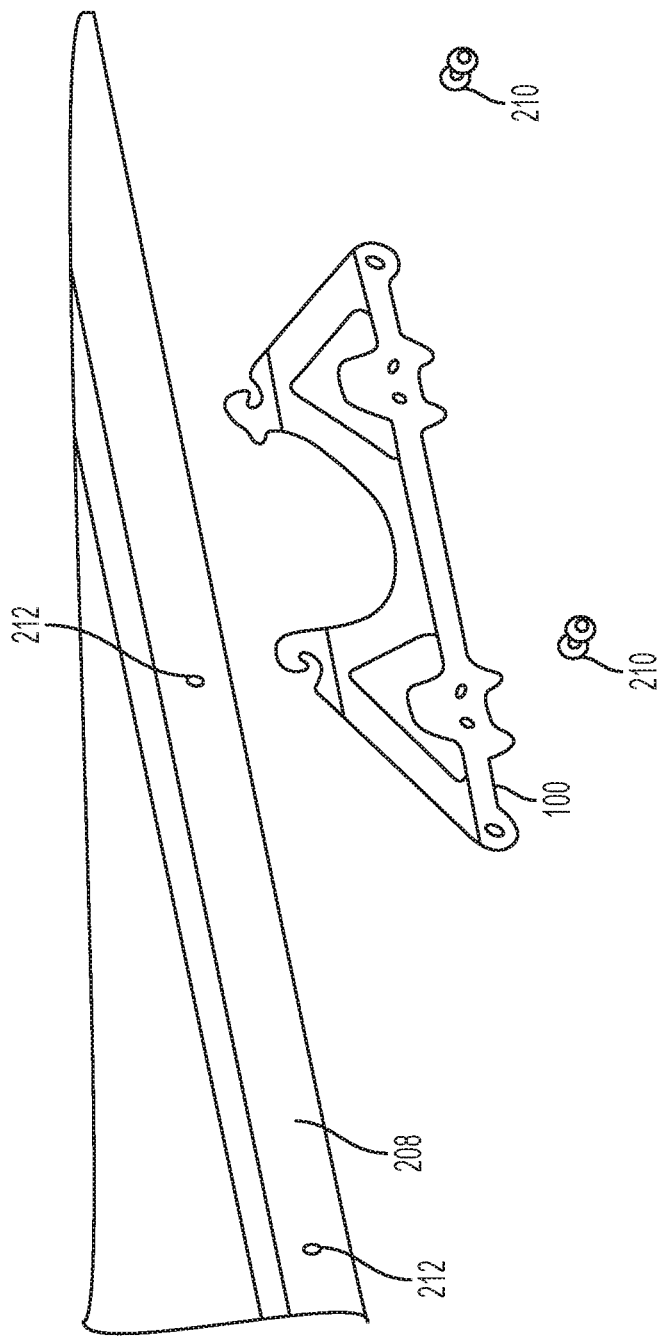
FIG. 2C shows an exploded view of the assembly of a portion of PV module and PV module bracket, including rivets.

FIG. 2C shows an exploded view of the attachment of PV module bracket 100 to PV module 202 using rivets 210 which can extend through rivet apertures 117 of PV module bracket 100 and rivet apertures 212 of frame 208. In embodiments, other attachment mechanism can be used to attach PV module bracket 100 to PV module 202 including, bolts, adhesives, welding, or integrally forming a bracket and at least a portion of the frame. While PV module bracket 100 could be attached to PV module 202 on-site at the site of installation of a PV array, assembling at a factory minimizes the time spent handling each PV module at the installation site and also reduces the number of tools needed for installation, both of which drastically reduce installation time and costs. Further, by assembling PV module assemblies at a factory, PV module assemblies to be used on multiple projects can be assembled together, thus benefitting from the economies of scale of producing larger numbers of an item at one time as opposed to producing the same items at many different times.

Figure 3A:
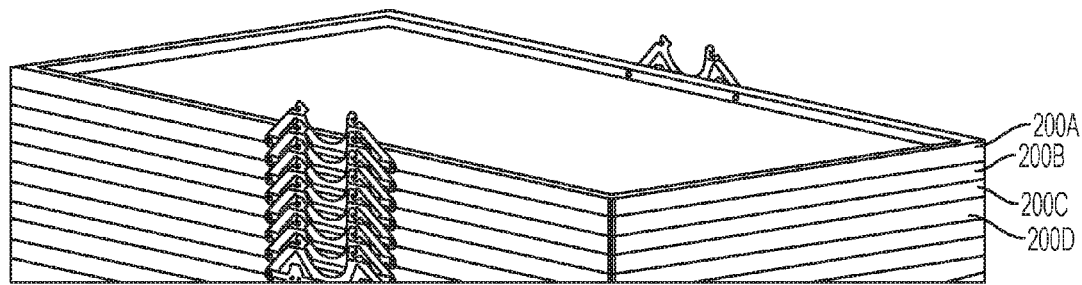
FIG. 3A shows a section of a stack of PV module assemblies utilizing PV module connectors according to aspects of the disclosure.
Figure 3B:
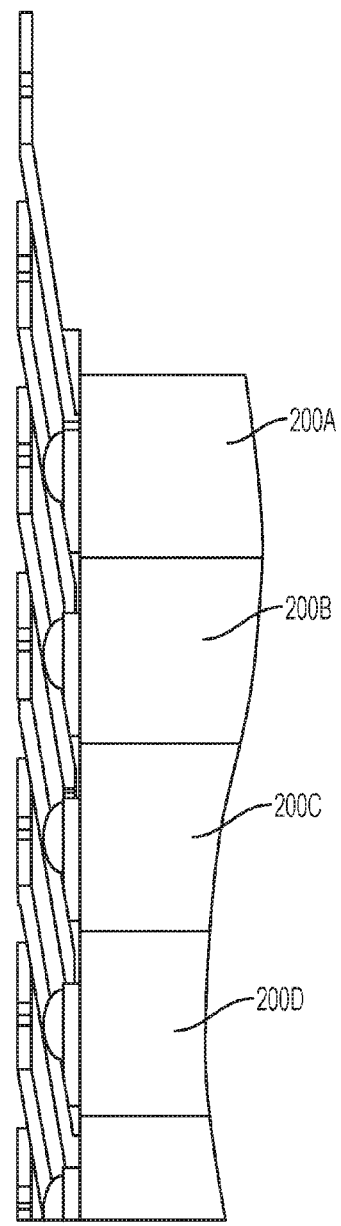
FIG. 3B shows a side view of a section of a stack of PV module assemblies.
Figure 3C:
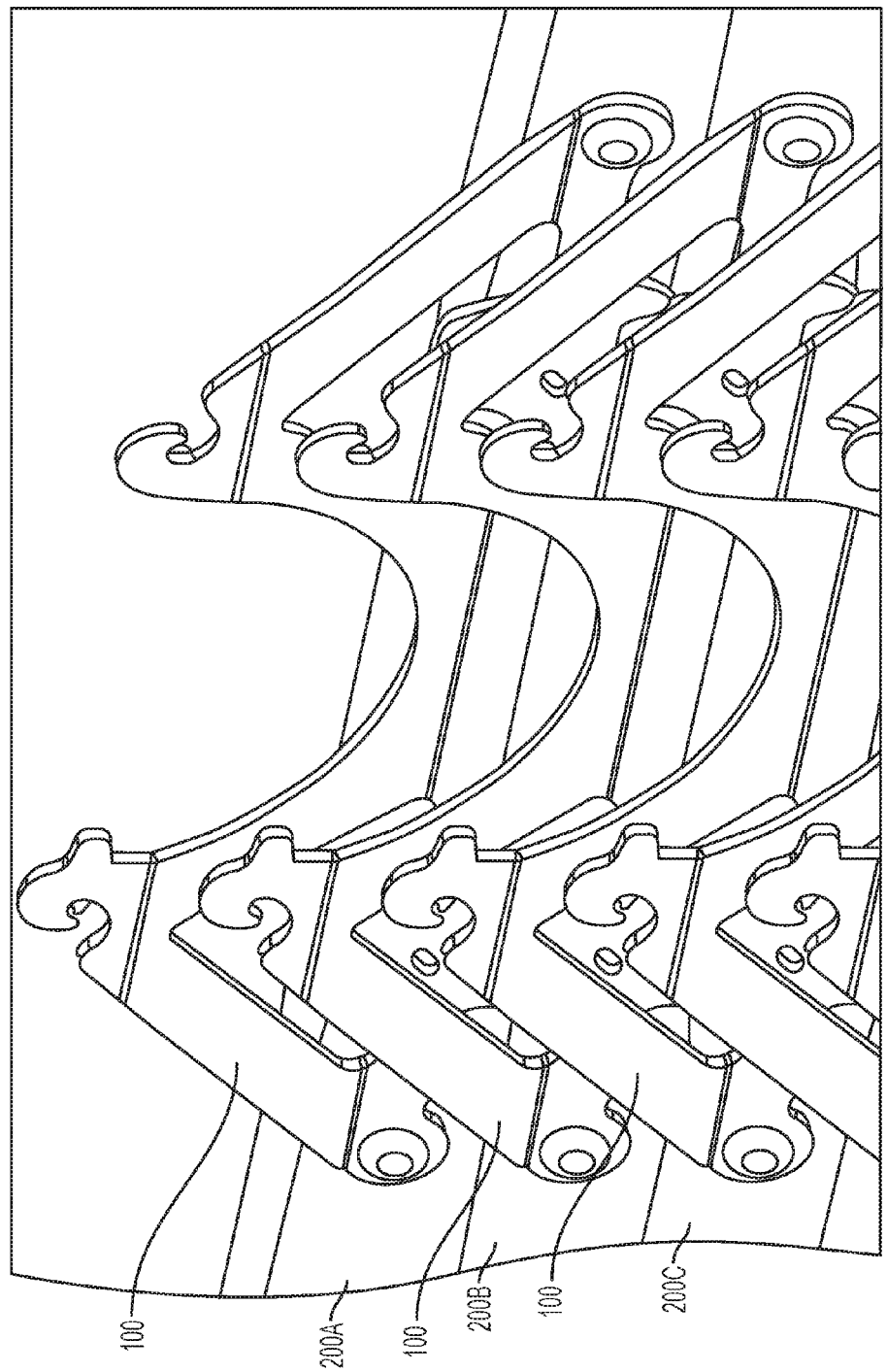
FIG. 3C shows a detailed section of the stack of PV module assemblies of FIG. 3A, including nested PV module brackets.

As shown in FIGS. 3A, 3B, and 3C, once attached to the frames of respective photovoltaic modules thereby forming an assembly, a plurality of such PV module assemblies including PV module assemblies 200A. 200B, 200C, and 200D can be stored in a stacked configuration. Stacking PV modules assemblies can be an efficient use of storage space because PV module brackets can be configured to nest when attached to stacked PV modules. The volume occupied by a number of stacked PV modules assemblies can be only slightly larger than the volume occupied by the same number of stacked PV modules without attached PV module brackets. This small increase in volume is possible because PV module brackets 100 allow adjacent PV modules 202 to either contact or nearly contact each other in a similar fashion as the PV modules would without PV module brackets 100 attached. This efficient use of space is not only beneficial during storage, but also during transit because additional, or larger, trucks are not needed to transport PV modules with the brackets already attached compared to the same PV modules without brackets attached. So the cost and time savings of pre-assembling PV module assemblies 200 at a factory is not lost due to additional costs associated with storage and shipping PV module assemblies.

Figure 3D:
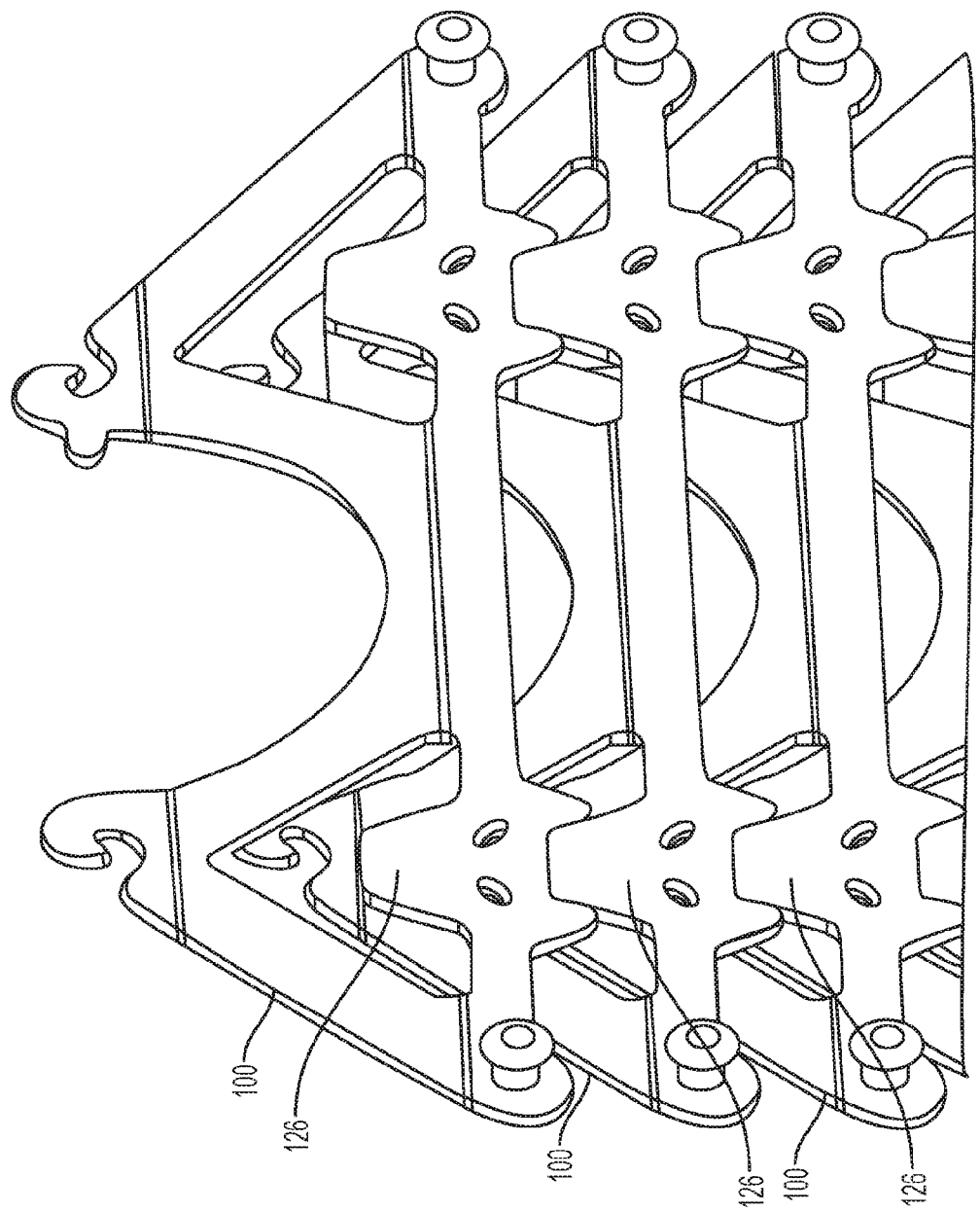
FIG. 3D shows a detailed section of the stack of PV module assemblies of FIG. 3A, including nested PV module brackets, from inward looking outward with PV modules hidden.

As shown in detail in FIGS. 3B, 3C, and 3D, PV module bracket 100 of PV module assembly 200B nests within PV module bracket 100 of PV module assembly 200C. For example, stacking projections 126 of PV module assembly 200C are received by stacking recesses 122 of PV module assembly 200B, and angled section 134 of PV module assembly 200C overlaps upper portion 106 of PV module assembly 200B, as is shown in FIG. 3A-C. As a further example, PV modules 202 of PV module assemblies 200A and 200B are located between PV module brackets 100 of PV module assembly 200C.

As shown, the additional height required to stack nesting PV module brackets 100 compared to stacking bracketless PV modules 202 can be only the height of lower portion 108 of PV module bracket 100 at the top of the stack, and the marginal height cost of stacking an additional PV module assembly can be the greater of distance 118 and the thickness of PV module 202. Also, the additional width needed to stack PV module assemblies 200 as shown is twice the distance between plane 138 and plane 144. However, any increase in size attributable to bracketed modules is offset by that fact that stacking pre-assembled PV module assemblies 200 eliminates the need to ship PV module brackets separately.

Additionally, space can be saved because the brackets provide stacking support, thereby eliminating the need for packing materials to secure stacked modules in a stacked configuration. Further the need of packing material between adjacent PV modules to prevent damage is also eliminated or at least reduced.

FIG. 3D, shows detail of inner surface of a plurality of PV module brackets 100, attached to PV modules 202, hidden in order to show detail of stacking mechanism. As shown, stacking projections 126 of PV module brackets 100 can be received by stacking recesses 122 of adjacent PV module brackets 100 so that upper stacking surfaces 116 and lower stacking surfaces 112 are adjacent PV module brackets contact. As noted, distance 118 can be based on the thickness of PV module. In embodiments where distance 118 is greater than the thickness of PV module 202, adjacent PV modules 202 do not contact each other and adjacent PV module assemblies 200 can be supported through contacting stacking features of adjacent PV module brackets 100, as shown in FIG. 3D. In embodiments where distance 118 is equal to the thickness of PV modules 202, adjacent PV modules 202 contact each other and adjacent PV module assemblies 200 can be supported through contacting adjacent stacking features, as well as direct contact of PV modules 202. In embodiments where distance 118 is less than the thickness of PV modules 202, adjacent PV modules 202 contact each other and can be supported through direct contact of PV modules, and alignment tabs 120 and alignment side walls 124 of adjacent PV module brackets 100 act for alignment purposes.

Figure 4:
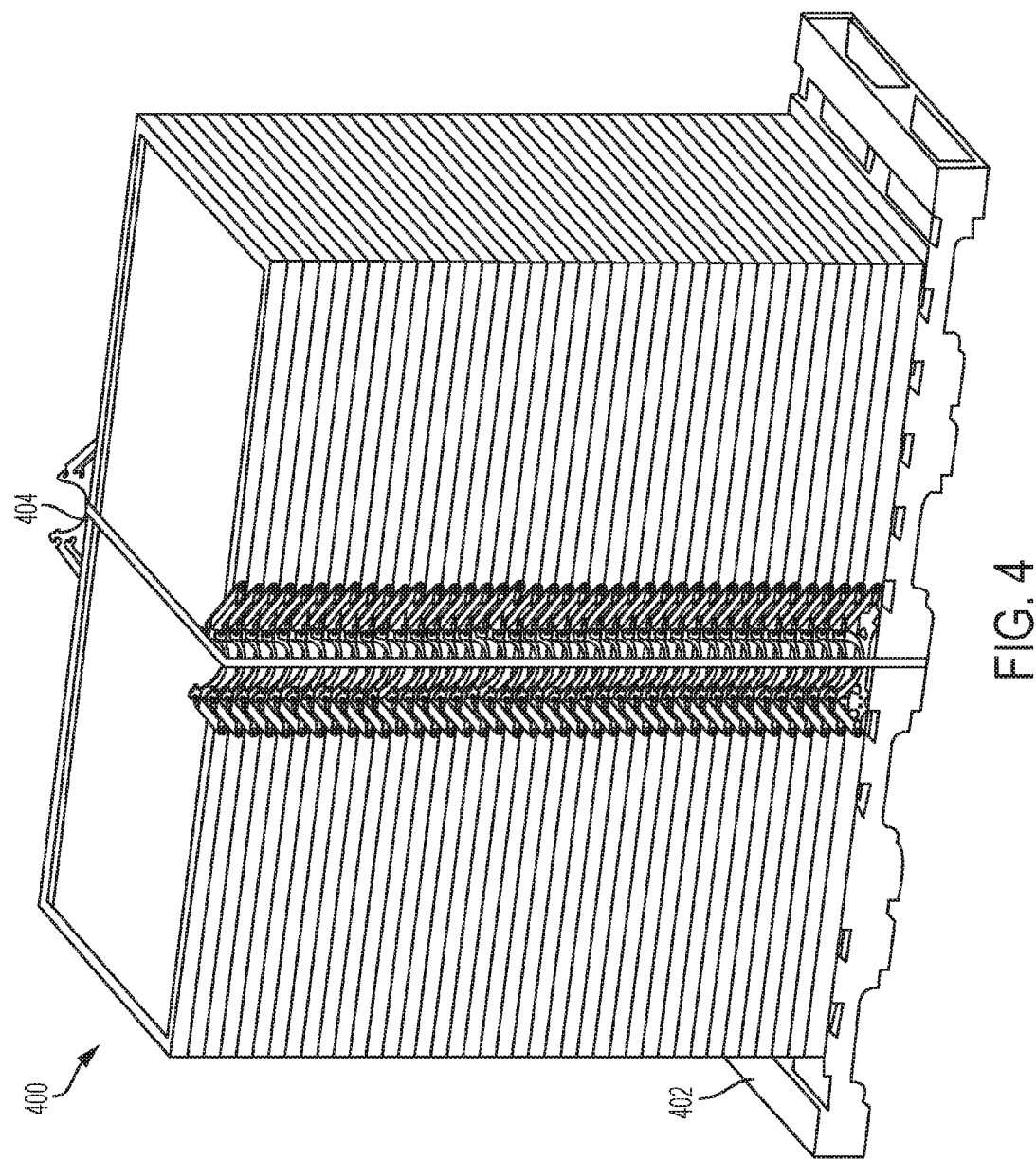
FIG. 4 shows a stack of PV module assemblies on a pallet for storage and transit purposes according to aspects of the disclosure.

FIG. 4 shows a stack 400 of a plurality of PV module assemblies 200, attached to a pallet 402 with a strap 404. Strap 404 can primarily function to keep stack 400 from unstacking in the vertical direction. This may occur for example if a truck transporting stack 400 hits a bump and adjacent PV module assemblies 200 are jostled and caused to separate in the vertical direction. Relative displacement of adjacent PV module assemblies 200 in horizontal directions is prevented by PV module brackets 100. Specifically, movement relative to the length of PV module bracket 100 is prevented by engagement of alignment tabs 120 and alignment sidewalls 124 of adjacent PV module brackets 100. Further, movement perpendicular to inner surface 104 and outer surfaces 102 of PV modules brackets 100 can be prevented by engagement of outer surfaces of stacking portions 132 with inner surfaces of angled sections 134.

The pallet configuration shown in FIG. 4 can be very useful because it can be unloaded at an installation site and the entire stack may be moved to various locations around the site so that one PV module assembly 200 can be unstacked at a time at a final install location of PV module assembly 200 onto a torque tube. Because PV module assembly 200 can be pre-assembled with PV module brackets 100, this unstacking from stack to torque tube may be the only handling of PV module assembly 200 at the installation site, which can be a large time savings compared to conventional methods.

Figure 5A:
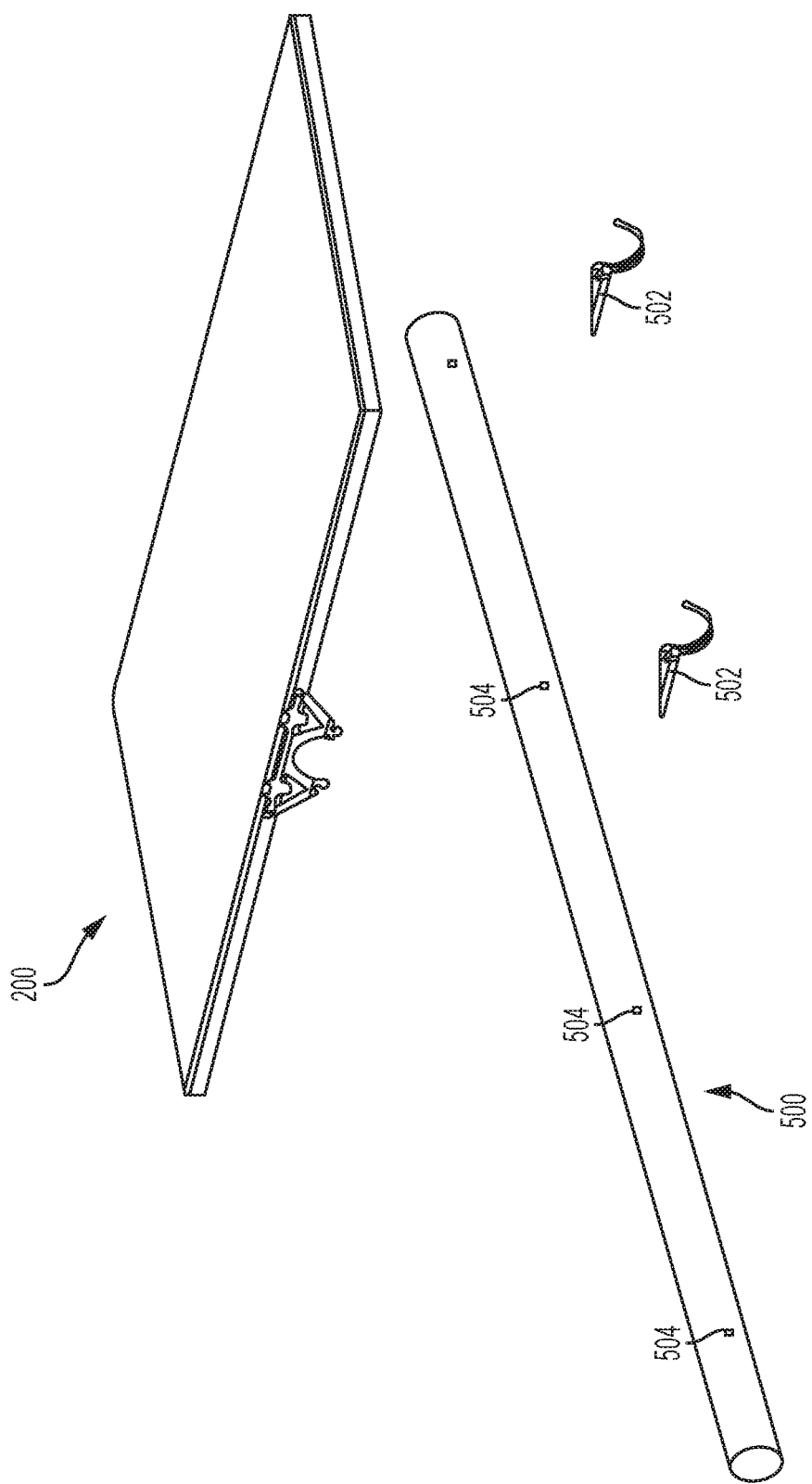
FIG. 5A shows an exploded view of a section of a PV array with a PV module assembly and a torque tube, according to aspects of the disclosure.

FIG. 5A shows an exploded view of a section of photovoltaic array which can include a photovoltaic module assembly 200, a torque tube 500, and two clamps 502. Torque tube 500 can include receiving holes 504 along the length of torque tube 500, positioned laterally proximate to the horizontal axis of symmetry of torque tube 500, and on both (opposing) sides of torque tube 500. Receiving holes 504 can be spaced to receive attachment tabs 113 of PV module assemblies 200 so that PV module assemblies 200 form a nearly continuous array of PV modules 202. Generally, in various embodiments, torque tube can be fabricated to include receiving holes 504 along the length of torque tube 500 so that PV module brackets 100 may be used to attach several photovoltaic module assemblies 200 to torque tube 500 with alternating orientations. In other embodiments, torque tube 500 can be fabricated to include receiving holes 504 along the length of torque tube 500 so that PV module connectors can be used to attach several photovoltaic module assemblies 200 on the same side of torque tube 500.

Figure 5B:
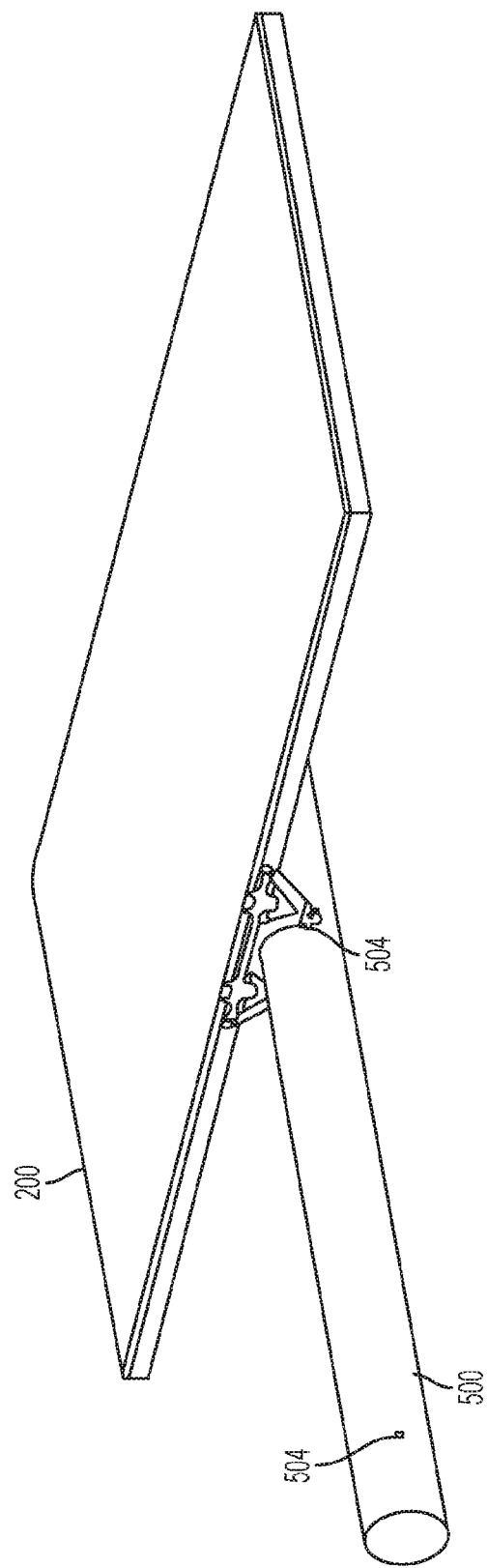
FIG. 5B shows a section of a PV array with a PV module assembly attached to a torque tube, according to aspects of the disclosure.
Figure 5C:
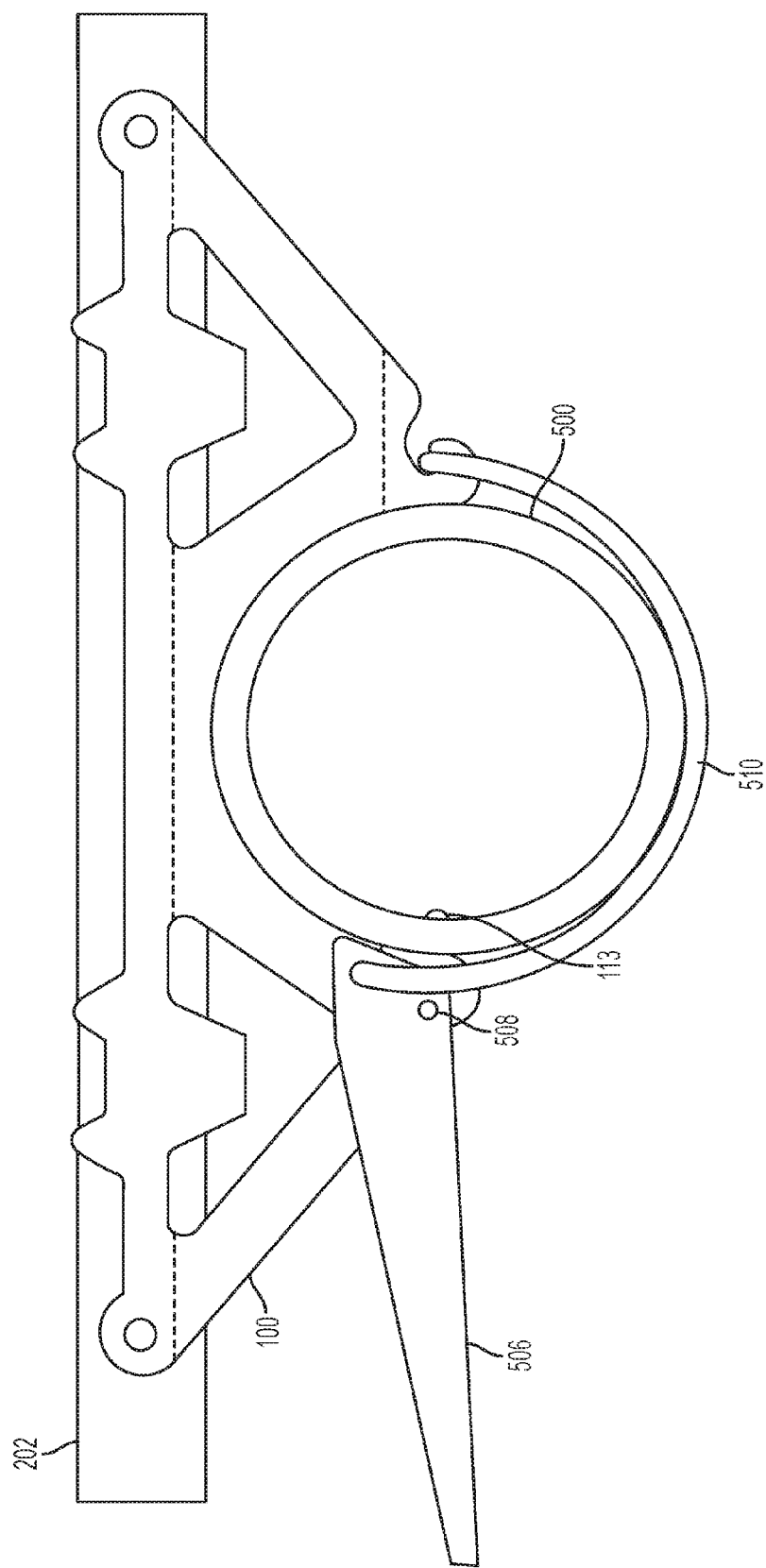
FIG. 5C shows a side view of a section of a PV array with a PV module assembly attached to a torque tube with a toggle clamp, according to aspects of the disclosure.

FIG. 5B shows photovoltaic array section at an intermediate stage of installation, where PV module assembly 200 can be balanced on torque tube prior to securing with clamp 502. As previously noted, PV modules brackets 100 can be configured to exert a restoring spring-like force when fit and stretched over the exterior surface of a torque tube 500 which assists with balancing PV module assembly 200 on torque tube 500. Once PV module assembly 200 is placed on torque tube 500 a clamp 502 may be used to securing PV module brackets 100 onto torque tubes, as shown in FIG. 5C. Clamp 502 comprises a handle 506, a pivot pin 508, and a curved strap 510. To fasten, pivot pin 508 can be placed in a clamp hook 115, and end of curved strap 510 can be placed in an opposite clamp hook 115, and handle 506 can be rotated toward PV module bracket 100 to toggle clamp 502 into an over-center locked position. In embodiments, clamp 502 can be used to attach PV module brackets 100 of two adjacent PV modules assemblies 200 as is shown in FIGS. 5D and 5E.

FIGS. 5D and 5E show a side of three PV module assemblies 200 mounted to a torque tube 500. As shown, clamp 502 can be used to secure adjacent PV module brackets 100 of two PV module assembles 200. FIG. 5E shows a detailed view of two adjacent PV module brackets 100. As shown, angled sections 134, which can allow for nesting, also allow for clamp sections 136 to contact and stacking sections 132 to be separated by a gap. This gap is beneficial in an assembled array because it accommodates for minor misalignments as well as thermal expansion and contraction of the PV modules 202. The closer installed modules are to one another, the easier it is to see any misalignment between adjacent modules. Having a small space between will break-up the continuity of the lines between adjacent modules allowing them to be slightly misaligned without the misalignment being easily perceived.

Figure 6:
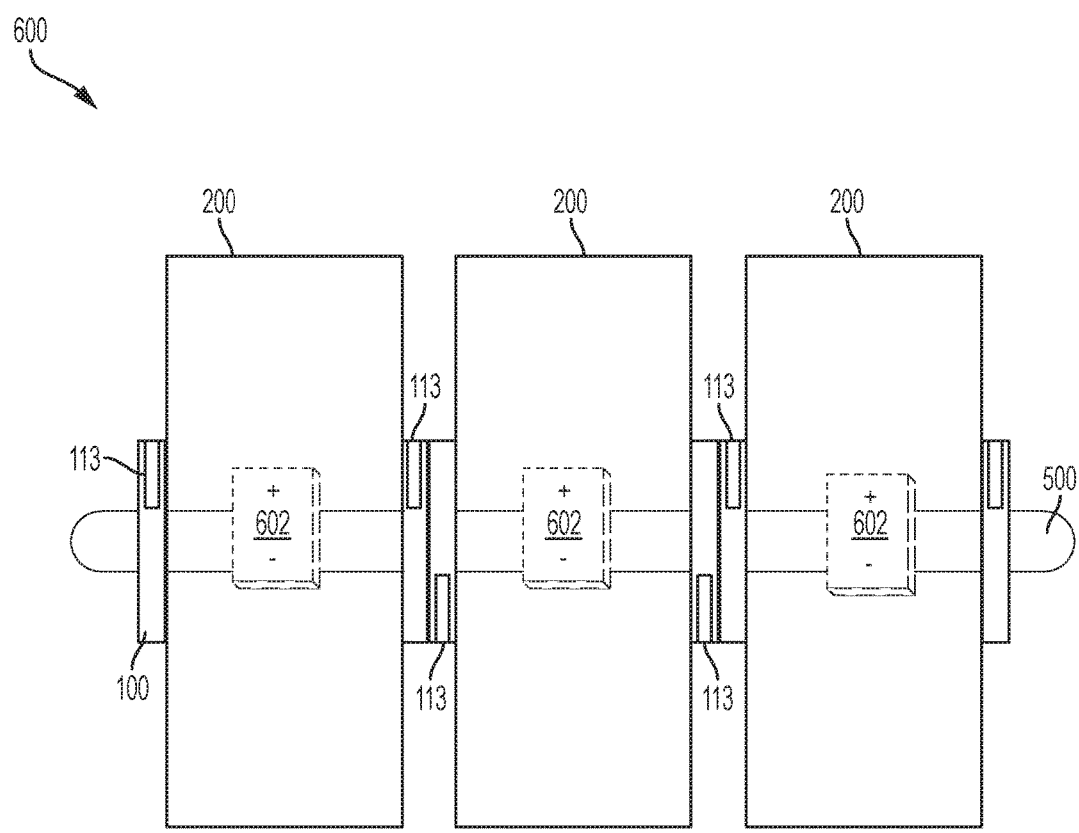
FIG. 6 shows a schematic plan view representation of a section of a PV array with PV module assemblies mounted to a torque tube with PV module brackets, according to embodiments of the disclosure.

FIG. 6 shows a schematic representation of a PV array section 600 including three PV module assemblies 200 mounted to torque tube 500. As part of photovoltaic array section 600, PV modules assemblies 200 can include junction boxes 602. Junction boxes 602 relay the solar energy collected by the photovoltaic cells. Junction boxes 602 are oriented on adjacent PV modules assemblies 200 so that their polarities are aligned to be efficiently wired and conduct electricity (e.g., the negative lead of one module connected to positive lead of the next module). Further, attachment tabs 113 of same PV module assembly 200 may face the same direction, and attachment tabs 113 of adjacent PV module assemblies 200 may face opposite directions. In this way clamp 502 can be used to secure adjacent PV module brackets 100 to torque tube 500, the assembly can include attachment tabs 113 entering receiving holes 504 on opposite sides of torque tube 500 which leads to a connection with balanced forces.

Figure 7:
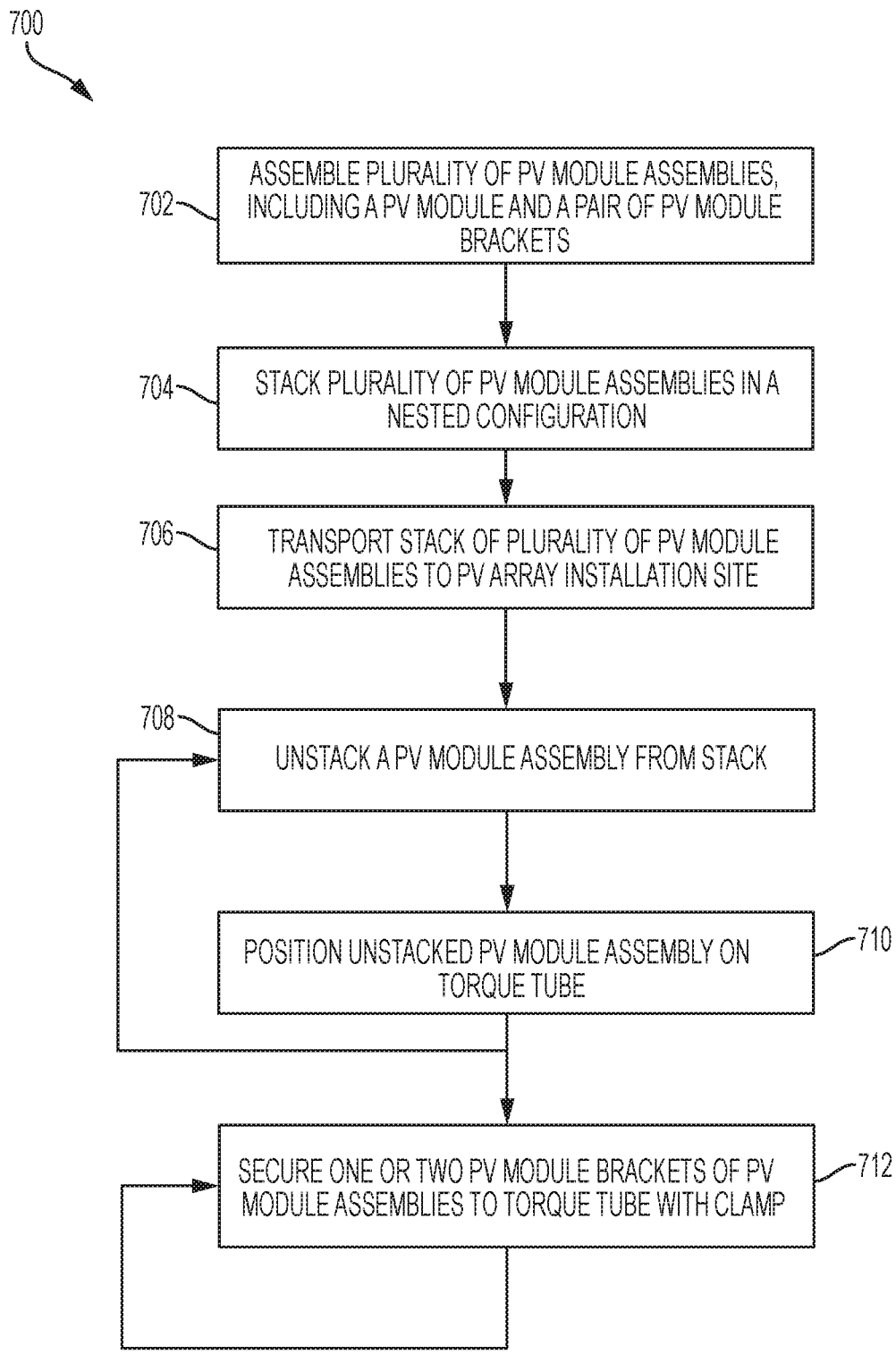
FIG. 7 shows an exemplary flowchart describing a method of assembling a PV array, according to embodiments of the disclosure.

FIG. 7 shows an exemplary flowchart 700 describing a method of assembling a photovoltaic array. At step 702, a plurality of PV module assemblies can be assembled. PV module assemblies can include a PV module and a pair of PV module brackets. As noted above, a pair of PV module brackets may be identical, mirror images, or substantial mirror images of each other. At step 704, the plurality of PV module assemblies can be stacked in a nested configuration. As disclosed above, a nested configuration allows for efficient use of space. The stack can be stored or sent directly to an array installation site. At step 706, the stack can be transported to a PV array installation site.

At step 708, a PV module assembly can be unstacked from the stack, and at step 710 the removed PV module assembly can be positioned onto a torque tube. In embodiments, PV module assemblies can be placed on the torque tube with the torque tube rotated to an orientation such that when correctly placed the PV module assemblies will sit substantially perpendicular to the ground. Each PV module assembly can be pivoted in at an angle and pressed down to such that the torque tube recess edge of the PV module brackets rest and frictionally interface with the torque tube, and such that attachment tabs insert or hook into receiving holes in the torque tube. Steps 708 and 710 can be repeated so that additional PV module assemblies from the stack can be placed on the torque tube in the same manner. In embodiments, prior to or after installing onto a torque tube each PV module assembly may have a junction box attached to the underside.

At step 712, one or two PV module brackets are secured to the torque tube with a clamp. As discussed above, clamp may secure a single PV module bracket to the torque tube or may secure PV module brackets of adjacent PV module assemblies to the torque tube. Step 712 can be repeated until each PV module assembly of the array is attached and secured to the torque tube.

PV module brackets 100 as disclosed herein can be constructed from materials appropriate for use with photovoltaic arrays and photovoltaic modules. Accordingly, PV module brackets can be constructed from lightweight construction materials including, but not limited to, stainless steel, aluminum, titanium, other metals, and alloys or intermetallics thereof. In various embodiments, PV module brackets 100 can each be formed out of a single piece of sheet metal that is stamped and bent into the appropriate shape, such as the shape shown in FIG. 1A. In alternative embodiments, PV module brackets can also be fabricated from roll-formed metal, casting, or other such process. PV module brackets 100 can be designed and constructed to withstand upwards of 305 lbs. of upforce (e.g. from torque tube) and 375 lbs. of downforce (e.g. from photovoltaic module).

In addition to tracker arrays, the brackets and/or clamps as disclosed herein can also be used for mounting PV modules in other types of PV installations, for example in fixed arrays. Such fixed arrays can include fixed tilt ground-based or roof-top mounting systems, where such systems can have individual or common tubular members to which the brackets and/or clamps can be used to attach PV modules.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, will become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A photovoltaic module assembly comprising:
    a first photovoltaic module including a top surface, a bottom surface opposite the top surface, a first sidewall, and a second sidewall opposite the first sidewall;
    a first mounting bracket affixed to the first sidewall including a first saddle portion and a first stacking feature; and
    a second mounting bracket affixed to the second sidewall including a second saddle portion and a second stacking feature;
    wherein the first and second saddle portions extend past the bottom surface of the first photovoltaic module and are configured to each receive and be coupled to a rotatable torque tube in a photovoltaic tracker array so that the first photovoltaic module may be rotated with the torque tube; and
    wherein the photovoltaic module assembly is configured to be stacked in a stacked configuration with a second photovoltaic module assembly, wherein the second photovoltaic module assembly is substantially identical to the photovoltaic module assembly and comprises:
        a second photovoltaic module including a second top surface, a second bottom surface opposite the second top surface, a third sidewall, and a fourth sidewall opposite the third sidewall;
        a third mounting bracket affixed to the third sidewall including a third saddle portion and a third stacking feature; and
        a fourth mounting bracket affixed to the fourth sidewall including a fourth saddle portion and a fourth stacking feature, wherein the third and fourth saddle portions extend past the second bottom surface of the second photovoltaic module and are configured to each receive and be affixed to the rotatable torque tube in the photovoltaic tracker array so that the second photovoltaic module may be rotated with the first photovoltaic module, and
    wherein in the stacked configuration the bottom surface of the first photovoltaic module faces the second top surface of the second photovoltaic module of the second photovoltaic module assembly with the first stacking feature interfacing with the third stacking feature and the second stacking feature interfacing with the fourth stacking feature.

2. The photovoltaic module assembly of claim 1, wherein the photovoltaic module assembly is configured so that in the stacked configuration the bottom surface of the first photovoltaic module contacts the second top surface of the second photovoltaic module.

3. The photovoltaic module assembly of claim 1, wherein the photovoltaic module assembly is configured so that in the stacked configuration the bottom surface of the first photovoltaic module contacts the second top surface of the second photovoltaic module, the first stacking feature contacts the third stacking features, and the second stacking feature contacts the fourth stacking feature.

4. The photovoltaic module assembly of claim 1, wherein the photovoltaic module assembly is configured so that in the stacked configuration the first stacking feature contacts the third stacking feature and the second stacking feature contacts the fourth stacking feature.

5. The photovoltaic module assembly of claim 1:
    wherein the first, second, third, and fourth stacking features each include;
    a stacking projection; and
    a stacking recess; and
    wherein the photovoltaic module assembly is configured so that in the stacked configuration the stacking projection of the first stacking feature is within the stacking recess of the third stacking feature, and the stacking projection of the second stacking feature is within the stacking recess of the fourth stacking feature.

6. The photovoltaic module assembly of claim 5, wherein the first mounting bracket defines a first aperture, and wherein the stacking projection of the first stacking feature is positioned within the first aperture.

7. The photovoltaic module assembly of claim 1, wherein the photovoltaic module assembly is configured so that in the stacked configuration the second photovoltaic module and the third and fourth mounting brackets of the second photovoltaic module assembly are positioned between portions of the first and second mounting brackets.

8. The photovoltaic module assembly of claim 1, wherein the first mounting bracket comprises;
a stacking section, affixed to the first sidewall and comprising the first stacking feature;
an angled section; and
a clamping section, configured to receive a clamp to secure the first mounting bracket to the torque tube;
wherein the angled section is positioned between the stacking section and the clamping section; and
wherein the stacking section forms a first angle with the angled section and the clamping section forms a second angle, identical to the first angle, with the angled section, such that the clamping section and stacking section include inner surfaces facing toward the second mounting bracket that are on different planes that are parallel.

9. The photovoltaic module assembly of claim 1:
wherein the first mounting bracket comprises a first attachment tab extending from the first saddle portion and configured to fit into a first receiving hole of the torque tube; and
wherein the second mounting bracket comprises a second attachment tab extending from the second saddle portion and configured to fit into a second receiving hole of the torque tube; and
wherein the first and second attachment tabs face the same direction.

10. The photovoltaic module assembly of claim 1, wherein the first mounting bracket further comprises a fifth stacking feature;
wherein the first stacking feature and the fifth stacking feature are positioned on opposite sides of the saddle portion.

11. The photovoltaic module assembly of claim 10, wherein the first and fifth stacking features each comprise a stacking recess, wherein the stacking recesses are each defined by:
an upper stacking surface facing in a same direction as the top surface of the photovoltaic module; and
two alignment tabs on either side of the upper stacking surface and extending from the upper stacking surface in a direction toward the top surface of the photovoltaic module.

12. The photovoltaic module assembly of claim 11, wherein the first and fifth stacking features each comprise a stacking projection, wherein the stacking projections each comprise:
a lower stacking surface facing in the same direction as the bottom surface of the photovoltaic module; and
two alignment sidewalls on either side of the lower stacking surface and extending from the lower stacking surface in a direction toward the top surface of the photovoltaic module.

13. The photovoltaic module assembly of claim 12, wherein a distance between the upper and lower stacking surfaces of the first stacking feature is equal to a thickness of the first photovoltaic module.

* * * * *